United States Patent
Burge (10) Patent No.: US 9,881,174 B2
(45) Date of Patent: *Jan. 30, 2018

(54) MULTI-LAYERED METADATA MANAGEMENT SYSTEM

(71) Applicant: Pandexio, Inc., Hermosa Beach, CA (US)

(72) Inventor: John Richard Burge, Hermosa Beach, CA (US)

(73) Assignee: Pandexio, Inc., Hermosa Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/261,747

(22) Filed: Sep. 9, 2016

(65) Prior Publication Data

US 2016/0379007 A1 Dec. 29, 2016

Related U.S. Application Data

(63) Continuation of application No. 14/134,935, filed on Dec. 19, 2013, now Pat. No. 9,443,098.

(60) Provisional application No. 61/739,367, filed on Dec. 19, 2012.

(51) Int. Cl.
*G06F 7/00* (2006.01)
*G06F 17/00* (2006.01)
*G06F 21/62* (2013.01)
*G06F 21/60* (2013.01)
*G06F 21/31* (2013.01)

(52) U.S. Cl.
CPC .......... *G06F 21/6218* (2013.01); *G06F 21/31* (2013.01); *G06F 21/604* (2013.01)

(58) Field of Classification Search
CPC .............. G06F 21/6218; G06F 21/31

USPC ........................................................ 707/694
See application file for complete search history.

(56) References Cited

U.S. PATENT DOCUMENTS

| 5,577,188 A | 11/1996 | Zhu |
| 6,877,137 B1 * | 4/2005 | Rivette ............ G06F 17/30876 707/E17.112 |
| 6,973,616 B1 | 12/2005 | Cottrille et al. |
| 7,243,301 B2 | 7/2007 | Bargeron et al. |

(Continued)

FOREIGN PATENT DOCUMENTS

| WO | 2007/015184 | 2/2007 |
| WO | 2009/006070 | 1/2009 |
| WO | 2011/075295 | 6/2011 |

OTHER PUBLICATIONS

IBM, "Annotation Concepts", IBM File Net P8 Documentation > Developer Help > Content Engine Development > Java and Net Developer's Guide > Annotations, http://pic.dhe.ibm.com/infocenter/p8docs/v4r5m1/index.jsp?topic=%2Fcom.ibm.p8.doc%2Fdeveloper_help%2Fcontent_engine_api%2Fguide%2Fgs_concepts.htm.

(Continued)

*Primary Examiner* — Binh V Ho
(74) *Attorney, Agent, or Firm* — Fish IP Law, LLC (57) ABSTRACT

A metadata layer management system is presented. Layers of metadata objects can be constructed where each metadata layer object comprises a rights policy. As entities interaction with the metadata layer objects, possibly by navigating links among the objects, each entity's access rights to the objects are governed by the rights policy. Further, the disclosed techniques provide for resolving rights conflicts among the rights policies of the metadata layer objects.

14 Claims, 5 Drawing Sheets

(56) References Cited

U.S. PATENT DOCUMENTS

| | | |
|---|---|---|
| 7,512,985 B1 * | 3/2009 | Grabarnik .......... G06F 21/6263 |
| | | 707/999.009 |
| 7,594,258 B2 | 9/2009 | Mao et al. |
| 7,899,843 B2 | 3/2011 | Dettinger et al. |
| 7,987,416 B2 | 7/2011 | Loeser et al. |
| 8,103,705 B2 | 1/2012 | Chitrapura et al. |
| 2004/0111728 A1 * | 6/2004 | Schwalm ................ H04L 29/06 |
| | | 719/316 |
| 2005/0256866 A1 | 11/2005 | Lu et al. |
| 2006/0048047 A1 | 3/2006 | Tao |
| 2006/0206507 A1 * | 9/2006 | Dahbour ........... G06F 17/30604 |
| 2007/0033190 A1 * | 2/2007 | Dodaro ................... G06F 21/10 |
| 2008/0263067 A1 | 10/2008 | Diedreiks et al. |
| 2009/0132907 A1 | 5/2009 | Shao et al. |
| 2009/0260060 A1 | 10/2009 | Smith et al. |
| 2011/0243373 A1 | 10/2011 | Li |
| 2011/0246514 A1 | 10/2011 | Bartholomew |
| 2011/0265034 A1 | 10/2011 | Garin et al. |
| 2012/0191716 A1 | 7/2012 | Omoigui |
| 2013/0007895 A1 * | 1/2013 | Brolley .................. G06F 21/62 |
| | | 726/28 |
| 2014/0096178 A1 * | 4/2014 | Shippy ................. G06F 21/316 |
| | | 726/1 |

OTHER PUBLICATIONS

Oracle, "5.3 Working with Annotations", Oracle Fusion Middleware User's Guide for Imaging and Process Management, 2010.

* cited by examiner

MULTI-LAYERED METADATA MANAGEMENT SYSTEM

This application is a continuation of U.S. application Ser. No. 14/134,935 filed on Dec. 19, 2013. U.S. application Ser. No. 14/134,935 claims the benefit of U.S. provisional application No. 61/739,367 filed Dec. 19, 2012. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is metadata management systems.

BACKGROUND

The following description includes information that may be useful in understanding the present invention. It is not an admission that any of the information provided herein is prior art or relevant to the presently claimed invention, or that any publication specifically or implicitly referenced is prior art.

As industrialized nations increasingly shift from industry-based economies to knowledge-based economies, knowledge must be created and transferred across workers faster and more efficiently than ever before. In order to compete, today's knowledge organization increasingly needs its workers to read more, learn faster and more easily share the resulting knowledge with co-workers. Some of the specific processes in need of acceleration include: reading and comprehending content while capturing the learned information, assimilating learned information acquired from reading multiple pieces of content, synthesizing the assimilated learned information into higher-levels of knowledge, including findings, conclusions and recommendations, and collaborating with others across these processes and sharing the resulting knowledge.

Prior to the widespread use of electronic documents, workers would frequently utilize manual content-processing tools including highlighters, pens and sticky notes in order to capture what they learned as they read directly onto the printed documents they were reading. Other manual tools such as index cards and notepads were often used to extract learned information outside the documents themselves, enabling juxtaposition of cross-document findings and facilitating higher-level cognitive processing. Knowledge transfer was often facilitated by creating and distributing secondary narrative documents, engaging in meetings and discussions or use of other manual tools, policies and processes. As documents became increasingly available in electronic form, electronic tools were developed that mirrored these manual tools. Software packages with annotation capabilities enable workers to add electronic highlights and notes to the pages of electronic documents, substituting for their manual counterparts. Electronic note-taking programs and word processors have provided electronic substitutes for the manual index cards and notepads, facilitating outlining and report writing.

While some annotation tools are now available in electronic form, they have failed to significantly accelerate content processing, organizational learning and knowledge transfer. These tools are all designed around data structures and information management mechanisms that treat documents themselves as the informational unit of thought-processing, sharing and collaboration. This results in frequent wasteful activities by workers who use them.

Efforts have been made toward making better tools for assimilating and sharing knowledge. One example includes U.S. Pat. No. 6,973,616 to Cottrille et al. titled "Associating Annotations with a Content Source", filed Jun. 24, 1999. Cottrille describes an annotation object that can point to content sources. The disclosed annotation objects can be handled separately from the source to which the corresponding annotations point. However, Cottrille fails to take into account that users of the annotation might not have permission or proper rights to access the annotation objects or the original content source.

A better approach would allow users to treat annotations as layers of metadata associated with one or more content sources and would ensure proper rights were enforced. Additional effort directed to managing annotations, even via parent-child relationships, include U.S. Pat. No. 7,243,301 to Bargeron et al. titled "Common Annotation Framework", filed Apr. 10, 2002; U.S. Pat. No. 8,103,705 to Chitrapura et al. titled "System and Method for Storing Text Annotations with Associated Type Information in a Structured Data Store", filed Oct. 23, 2008; U.S. Patent Application Publication No. 2009/0132907 to Shao et al. titled "Annotation Structure for Web Pages, Systems and Method for Annotation Web Pages", filed Nov. 20, 2007; PCT Application Publication No. WO 2009/006070 to Stull titled "Techniques for Managing Annotation Transformation for Context Changes", filed Jun. 23, 2008; U.S. Patent Application Publication No. 2006/0048047 to Tao titled "Online Annotation Management System and Method", filed Mar. 2, 2006; U.S. Pat. No. 7,899,843 to Dettinger et al. titled "Expanding the Scope of an Annotation to an Entity Level", filed Mar. 1, 2011; U.S. Pat. No. 7,512,985 to Grabarnik et al. titled "System, Method, and Computer Program Product for Implementing Search and Retrieval Compatible Data Obfuscation", filed Mar. 31, 2009; U.S. Patent Application Publication No. 2005/0256866 to Lu et al. titled "Search System and Methods with Integration of User Annotations from a Trust Network", filed Nov. 17, 2005; U.S. Patent Application Publication No. 2008/0263067 to Diederiks et al. titled "Method and System for Entering and Retrieving Content from an Electronic Diary", filed Oct. 23, 2008; PCT Application Publication No. WO 2007/015184 to Mauro et al. titled "Apparatus and Method for Automatically Determining Privacy Settings for Content", filed Feb. 8, 2007; U.S. Patent Application Publication No. 2009/0260060 to Smith et al. titled "Rich Media Collaboration System", filed Oct. 15, 2009; U.S. Pat. No. 6,877,137 to Rivette et al. titled "System, Method and Computer Program Product for Mediating Notes and Note Sub-notes Linked or Otherwise Associated with Stored ore Networked Web Pages", filed Apr. 5, 2005; and U.S. Pat. No. 7,594,258 to Mao et al. titled "Access Control Systems and Methods Using Visibility Tokens with Automatic Propagation", filed Sep. 22, 2009. Unfortunately, these references also fail to provide insight into managing rights associated with annotations or other types of metadata.

Some minor effort has been directed to attaching security policies to annotations as discussed within IBM's FileNet P8 Platform documentation. The FileNet system provides for optionally assigning security policies to annotations where security can come from both its class or from its associated annotation object (see URL pic.dhe.ibm.co/infocenter/p8docs/v4r5m1/ index.jsp?topic=%2Fcom.ibm.p8.doc%2Fdeveloper_help%2Fcontent_engine_api%2Fguide%2Fannotations_concepts.html. Although useful with respect to applying security, the FileNet system fails to appreciate that rights management policies, not necessarily a security policy, associated with metadata layer object can be in conflict with each other. For example, an annotation object created by a CEO object might not necessarily be available to a line worker. Thus there remains a need for a metadata layer management system capable of reconciling differences among rights policies of metadata layer objects.

Accordingly, there is a need for a fundamentally new way for workers to process content, and create and share knowledge across the organization that reduces this waste and mitigates the information overload they currently suffer as a result of it. There is further a need for a system that achieves this while meeting the needs of knowledge organizations to maintain needed security, privacy, copyright and other informational controls.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

The inventive subject matter provides apparatus, systems and methods in which a metadata management system ensures access rights of metadata layers are enforced. Contemplated metadata management systems comprise a metadata database, and a metadata management engine. The database is configured to store one or more metadata layer objects where each of the metadata layer objects is capable of pointing to other objects. For example, a metadata layer object can point to external objects including a literal (e.g., a file, a document, an image, etc.), other metadata layer objects (e.g., a parent, a child, a point, a fact, a conclusion, etc.), or other objects. Further, each metadata layer object can comprise a rights policy that governs how entities access the corresponding metadata layer object as well as navigating to other metadata layer objects. The metadata management engine can be configured to instantiate metadata layer objects and link them to each other, possibly under direction of a user based on an annotation event. The engine can further generate one or more rights policies associated with the instantiated metadata layer object, possibly based on the user's profile or preferences, the annotation content, or other factors. As users engage with the instantiated metadata layer objects and navigate among linked objects, the engine determines an authorization level for the user by resolving differences among the rights policies of the linked objects. Each metadata layer object can then be presented to a user according to the authorization level via an output device (e.g., a display).

Different computer actions can be defined as annotation events by the metadata management engine. In some embodiments, the annotation event can include receiving a selection of at least a portion of a source document. In other embodiments, the annotation event can include receiving an identification of a boundary around at least a portion of a source document. Once an annotation event is recognized, the engine instantiates a new metadata layer object. The instantiated metadata layer object can include metadata content such as a fact, a point, a conclusion, or a synthesis. The metadata content can include a portion of a source document.

The instantiated metadata layer object can be linked to other external metadata layer objects such as parent metadata layer objects and child metadata layer objects. The link to external metadata layer object can include a document address such as a document object identifier (DOI), an Internet Protocol (IP) address, a domain name, a file handle, a file name, or a hash address. The link can also include a document coordinate to specify a location within a document. The document coordinate comprises at least one of the following: a time index, a graphical coordinate, a paragraph number, a line number, a word number, a pair of document coordinate attributes, and document object model (DOM) element coordinate.

The rights policy of a metadata layer object governs access to the metadata layer object. The policy can be generated based on at least one of user information, document information, metadata rights policy of the parent metadata layer object, and metadata rights policy of the child metadata layer object.

The policy can specify different access levels to the metadata layer object based on a user group or even rights policy of an external metadata layer object. The rights policy can also include a policy that governs restriction of access to a set of external metadata layer objects. The rights policy can also be multi-dimensional. For example, the rights policy can include a policy that governs restriction of linking to external objects and also include a policy that governs restriction of accessing the metadata content.

The external metadata layer objects can include parent metadata layer objects and child metadata layer objects of the instantiated metadata layer object. The external metadata layer objects can include a literal or a source document.

In some embodiments, the metadata management engine resolves conflicts between rights policies of different metadata layer objects (e.g., rights policy of the instantiated metadata layer object and rights policy of an external metadata layer object) based on a set of resolution rules. The resolution rules can include priority order among multiple metadata rights policies. The priority order can specify that the rights policy of a parent metadata layer object has a higher priority than the metadata rights policy of the instantiated metadata layer object. The priority order can specify that the rights policy of a child metadata layer object has a higher priority than the metadata rights policy of the instantiated metadata layer object.

The metadata management engine can be further configured to aggregate usage metrics associated with the instantiated metadata layer object, such as a trend, uses, audits, conflicts, reports, alerts, layer links, and source links, accesses.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, host, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The inventive subject matter provides apparatus, systems and methods for managing the security and access rights of different metadata layer objects within a multiple-layered metadata hierarchy. The different metadata layer objects are linked together by pointers and/or links forming the multiple-layered metadata hierarchy. In some embodiments, each metadata layer object includes a rights policy. The rights policy of a metadata layer object specifies the security and access rights for different users in accessing the metadata layer object, and security and access rights for different users in accessing other external metadata layer objects that are linked from the metadata layer object according to the multiple-layered metadata hierarchy. In one aspect of the invention, a metadata management system is configured to manage user accesses to different metadata layer objects by managing and resolving any potential conflicts between the security and access rights of the different metadata layer objects within a multiple-layered metadata hierarchy.

Figure 1:
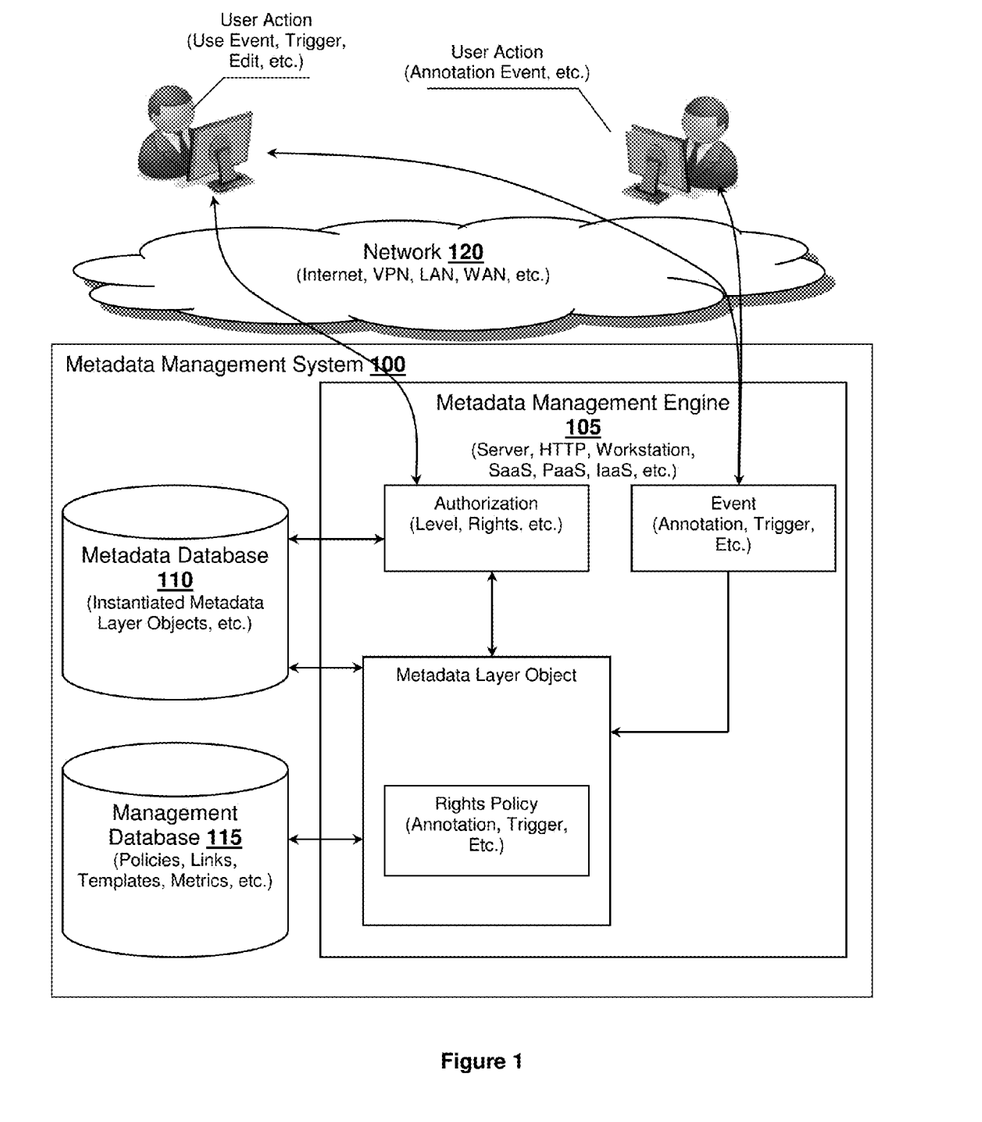
FIG. 1 is a schematic of a metadata management system capable of managing security and access rights of metadata layer objects.

FIG. 1 illustrates an example metadata management system 100. The metadata management system 100 includes a metadata management engine 105 and a metadata layer database 110 that is configured to store linkable instantiated metadata layer objects. In some embodiments, the metadata management engine 105 is configured to instantiate a new metadata layer object upon recognition of an annotation event or other types of trigger as illustrated below.

The annotation event can take on many different forms. In some embodiments, an annotation event is recognized when the metadata management engine 105 receives a user selection of a portion of source content (e.g., a web page, a text document, a spreadsheet, an image, a video clip, an audio clip, etc.). The user can provide the annotation event via a user computer and over a network (e.g., network 120). Network 120 can be the Internet, a virtual private network (VPN), local area network (LAN), wide area network (WAN), etc.

In some of these embodiments, the metadata management system 100 provides a user interface tool that allows the user to select a portion from the source content. For example, the metadata management system 100 of some embodiments can allow a user to select a portion of content by highlighting text from a document (similar to how one would select text in Microsoft Word®). In other embodiments, the metadata management system 100 can allow a user to select a portion of content by blocking an area (or defining a boundary of the area) within a document (or an image). In such cases, the metadata management engine 105 can capture literal data falling with the bounding box, possibly via OCR or other recognition techniques that can capture content information.

For source content that has a temporal dimension such as a video clip or an audio clip, the metadata management system 100 can allow the user to select a portion of content by defining a temporal range (e.g., indicating a beginning time and an end time) within the source content.

Figure 2:
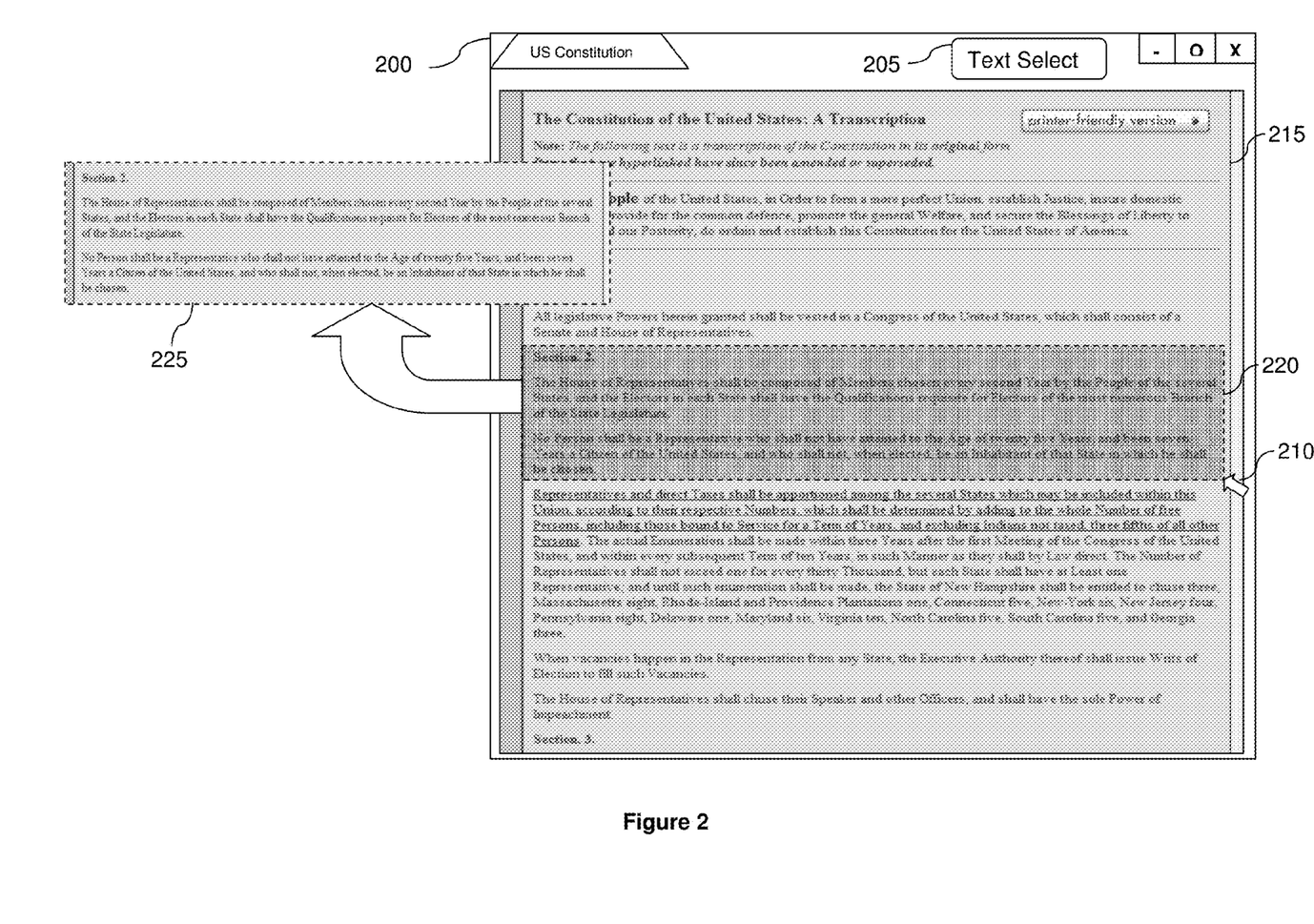
FIG. 2 provides an illustrated example of an annotation event.

FIG. 2 illustrates an example annotation event that can be recognized by the metadata management system 100. In this example, a user is viewing a webpage 215 that displays a transcript of the Constitution of the United States using a web browser 200 at the user's personal computer. The personal computer can be connected with the metadata management system 100 via the Internet. The web browser 200 includes a software program (e.g., a plug-in) that when executed provides a tool for the user to select a portion of the content being displayed on the web browser. In some of these embodiments, the tool includes a graphical user interface (e.g., a button 205) that when selected would activate the content selection process of the tool. After activating the content selection tool, the user can drag the cursor 210 across a portion 220 of the web page to define a boundary for the selected area (or selected text). In this example, the user has dragged the cursor to define a portion 220 of the web page that includes two paragraphs of Section 2 of the U.S. Constitution.

In addition to providing the annotation tool as a web service, the metadata management system 100 can provide the tool as a downloadable module that the user can install on his/her own personal computer.

Upon recognizing this annotation event created by the user, the metadata management engine 105 is configured to instantiate a new metadata layer object by linking the new metadata layer object to an external object such as the source document (the webpage 215). The metadata management engine 105 can link the metadata layer object by storing an identifier to the source content. Preferably, the identifier can direct a user to the source document (e.g., the webpage 215 in the above example) from which the content is selected. Examples of the source document identifier include a uniform resource locator (URL), a uniform resource identifier (URI), an IP address, a file name, an object reference, and other types of pointer.

In some embodiments, the identifier can also include a set of document coordinates that point to the selected portion of the source document. The document coordinates can be a time index, a graphical coordinate, a paragraph number, a line number, a word number, a pair of document coordinate attributes, or document object model (DOM) element coordinate.

The metadata management engine 105 is also configured to insert other types of data into the newly instantiated metadata layer object. For example, the metadata management engine 105 can include a copy of the selected content (that is clipped from the source document) in the metadata layer object. When the source document is a text document, the copy of the selected content can include a clipped image of the portion of the document selected by the user or the portion of texts that were selected by the user from the source document (e.g., the clipped selected content 225 in FIG. 2). The copy of the selected content can also include other types of data (e.g., image data, audio data, video data, etc.) depending on the source document type. It is noted that the copy of the selected content is independent and separate from the source document, such that any editing done to the copy of the selected content will not affect the original source document.

The user who selected the portion of the source content (the creator) can also add new content to the metadata layer object. The new content can be an assertion (e.g., a fact, a point, an assertion, a conclusion, a synthesis, etc.) that the creator has derived from the selected portion of the source content. In the example above, the creator can insert a point "you have to be 25 years old to serve as a member of the House of Representative" that the creator has derived from the selected portion 220 of the source content.

Each object in the system can be referenced via a pointer that comprises a document address. The document address could reference a file, an annotation object, a metadata layer object, a web page, or other type of document. Example document addresses can include a file handle, an IP address, a URL, a URI, a Document Object Identifier (DOI), a domain name, a top level domain, a file name, a hash address in a hash space (e.g., a BitTorrent address, etc.), or other type of address. In view that the metadata content can include actual portions of a literal or source document, the document address can include coordinates within the document. Internal document coordinates can include a time index (e.g., within audio or video), a graphical coordinate (e.g., x, y, z, etc.), a paragraph number, a column number, a line number, a word number, a coordinate attribute pair (e.g., page and line number, column and line number, etc.), a document object model (DOM) element coordinate, or other addressing scheme.

It is noted that the source document (such as webpage 215) can also be associated with one or more metadata layer objects. This happens when some of the assertions being made in the source document (e.g., the webpage 215) are derived from other documents. Each of these assertions has an associated metadata layer object that was instantiated by the metadata management system 100, and the associated metadata layer object also includes a link to the document from which the assertion was derived (e.g., another web page, a book, etc.).

When the source content (and more specifically, the selected portion of the content) is associated with one or more metadata layer object, the metadata management engine 105 is configured to also link the newly instantiated metadata layer object to the one or more metadata layer objects associated with the source content as parent metadata layer objects (e.g., by including a pointer to point to the one or more metadata layer objects using the object referencing scheme as discussed above). In some embodiments, the metadata management engine 105 is also configured to update the metadata layer objects associated with the source content to include a link (e.g., a pointer) that points to the newly instantiated metadata layer object as a child metadata layer object.

In some embodiments, the assertion that the creator makes can be included in a publication, either as the entire publication or as part of the publication (one of the many assertions made in a publication, for example). As such, the assertion can be used by the creator or another user to derive another assertion. For example, another user can initiate an annotation event by selecting (e.g., blocking, clipping, defining a boundary, etc.) a portion of the publication that includes the assertion and deriving the other assertion based on the selected portion of the publication. The metadata management engine 105 is configured to then instantiate a new metadata layer object that links to the selected portion of the publication as a source document. In addition, the metadata management engine 105 is also configured to include a link (e.g., a pointer) in the new metadata layer object that points to the metadata layer object associated with the assertion.

The pointers in the instantiated metadata layer objects give rise to creating a hierarchy of objects that link to each other in a manner that allows users to navigate from one object to another. Such an approach is considered advantageous with respect to knowledge workers where workers analyze information and provide conclusions with respect to their analysis. A knowledge worker can create a first set of annotations, or other metadata, associated with a source document (i.e., a literal) where the annotations include annotation content (e.g., conclusions, points, facts, synthesis, etc.). Yet other workers can then provide additional annotations that link to the first set of annotations. As more individuals work with these units of knowledge, they can navigate from parent to child to literals while also observing the knowledge imparted by others. For example, readers of a publication that contain assertions can easily trace back to the source (e.g., for verification, for gaining additional in-depth information, etc.) using the metadata hierarchical structure described herein. Such approaches are considered advantageous to knowledge workers in the enterprise space.

Figure 3:
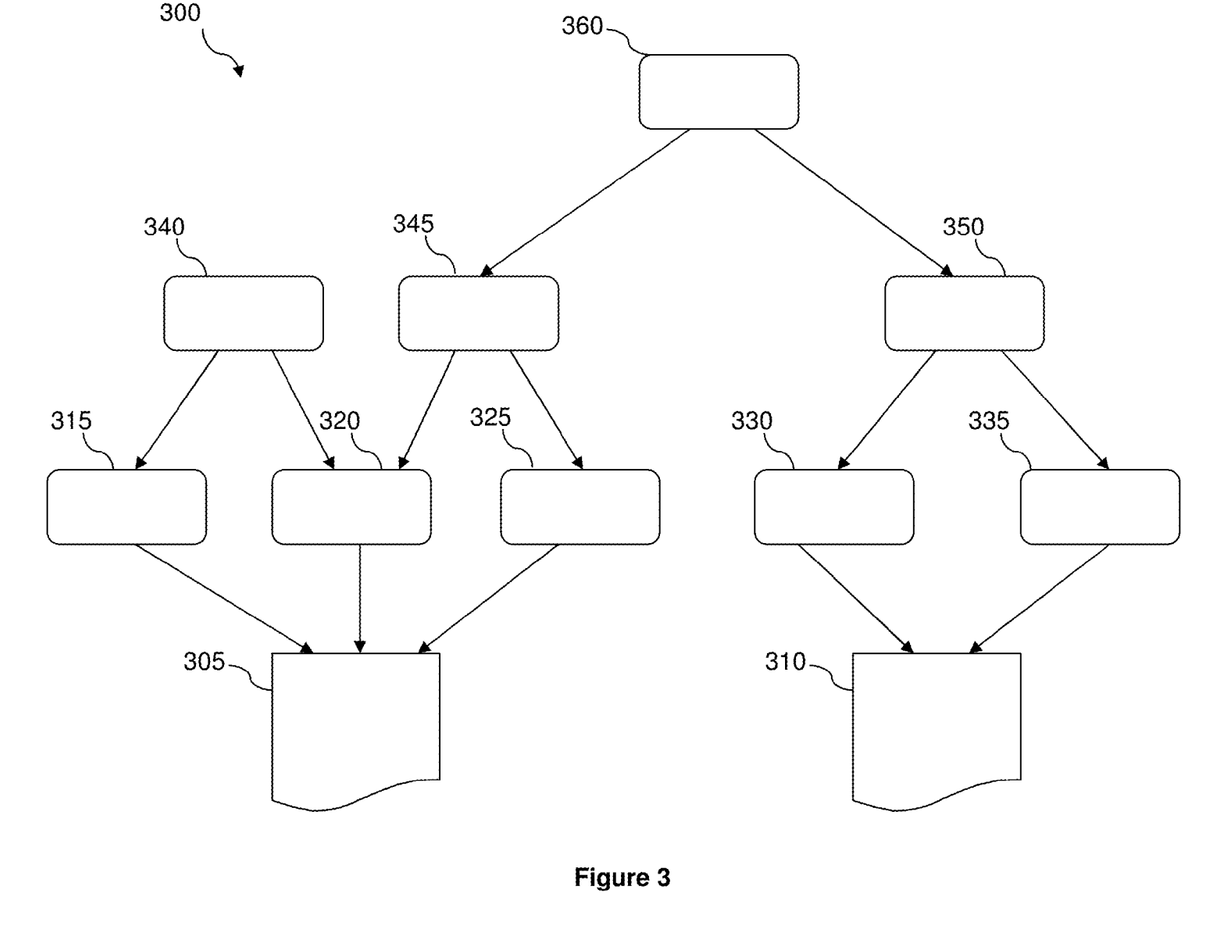
FIG. 3 conceptually illustrates an example metadata objects hierarchy.

FIG. 3 illustrates an example of a metadata hierarchy. FIG. 3 illustrates a graph 300 that represents the relationships among an example set of metadata layer objects and source documents. As shown, the graph 300 includes source documents 305 and 310. Source documents 305 and 310 can include any type of literals, such as books, publications, articles, websites, video, audio, etc. The graph 300 also includes metadata layer objects 315-360. As mentioned before, a metadata layer object can be instantiated to link to a literal (e.g., a book, a publication, etc.). That is, the assertion that is associated with the metadata layer object is derived directly from a source, rather than deriving from another assertion. In this example, the graph 300 shows that metadata layer objects 315, 320, and 325 all point to the literal represented by source document 305. Similarly, metadata layer objects 330 and 335 both point to source document object 310.

In addition to, or instead of, creating an assertion based on a literal, an assertion can also be created based on other assertion(s). As shown in the graph 300, metadata layer object 340 points to metadata layer objects 315 and 320 as its information source, indicating that the assertion 340 is generated/derived based on assertions 315 and 320. Similarly, metadata layer objects 345 points to metadata layer object 320 and 325 as its information source, and metadata layer object 350 points to metadata layer object 330 and 335 as its information source.

Furthermore, an assertion can also be associated with (directly or indirectly) more than one literal. For example, metadata layer object 360 points to metadata layer objects 345 and 350 as its information source. In this case, metadata layer objects 345 and 350 are indirectly associated with different literals—source document 305 and source document 310, respectively. In some embodiments, a graph such as graph 300 in FIG. 3 represents a metadata hierarchical structure of a knowledge that is derived from one or more information sources.

Further, the disclosed system provides for enforcing rights and resolving rights conflicts among objects. As such, the metadata management engine 105 can further generate a rights policy for the newly instantiated metadata layer object. One should appreciate that each instantiated object can have its own policy or policies governing how users interact with the metadata layer object and linked external metadata layer objects. For example, the rights policy can include rules that specify who can access the metadata layer objects and the linked external metadata layer objects. The rights policy can also specify a set of restrictions for each user. For example, the rights policy can include rules that provide restrictions including restrictions to access external metadata objects, restrictions on linking to objects, restrictions on accessing metadata content of the object, or even rules on resolving conflicts among objects as discussed below for different users. Example information that can fold into generation of the rights policy includes user information, source document information, rights policy information of a child or parent object, copyright information, DRM information, or other available information.

In some embodiments, the rights policy can be generated automatically by the metadata management system 100 using a priori defined templates (that are stored in management database 115), or generated by the creator of the metadata layer object. The rights policy can specify different access levels and/or restrictions for different users who attempts to access the metadata layer object based on different criteria. For example, the rights policy can be configured to specify different access rights/restrictions based on profile information of the user who tries to gain access to the metadata layer object, such as the role of the user within an organization (e.g., management, staff, doctor, nurse etc.), security clearance (e.g., unclassified, secured, secret, top secret, compartmentalized, etc.) of the user. The rights policy can also be configured to specify different access rights/restrictions for different users based on the different devices that the user is using to try to gain access to the metadata layer object. The rights policy can also be configured to specify different access rights/restrictions for different users based on the network via which the request to access the metadata layer object is received from the user device (e.g., via the Internet, a LAN, a WAN, a VPN, etc.).

In some embodiments, the metadata management engine 105 can prompt the creator of the metadata layer object for information to generate the rights policy for the metadata layer object.

Figure 4:
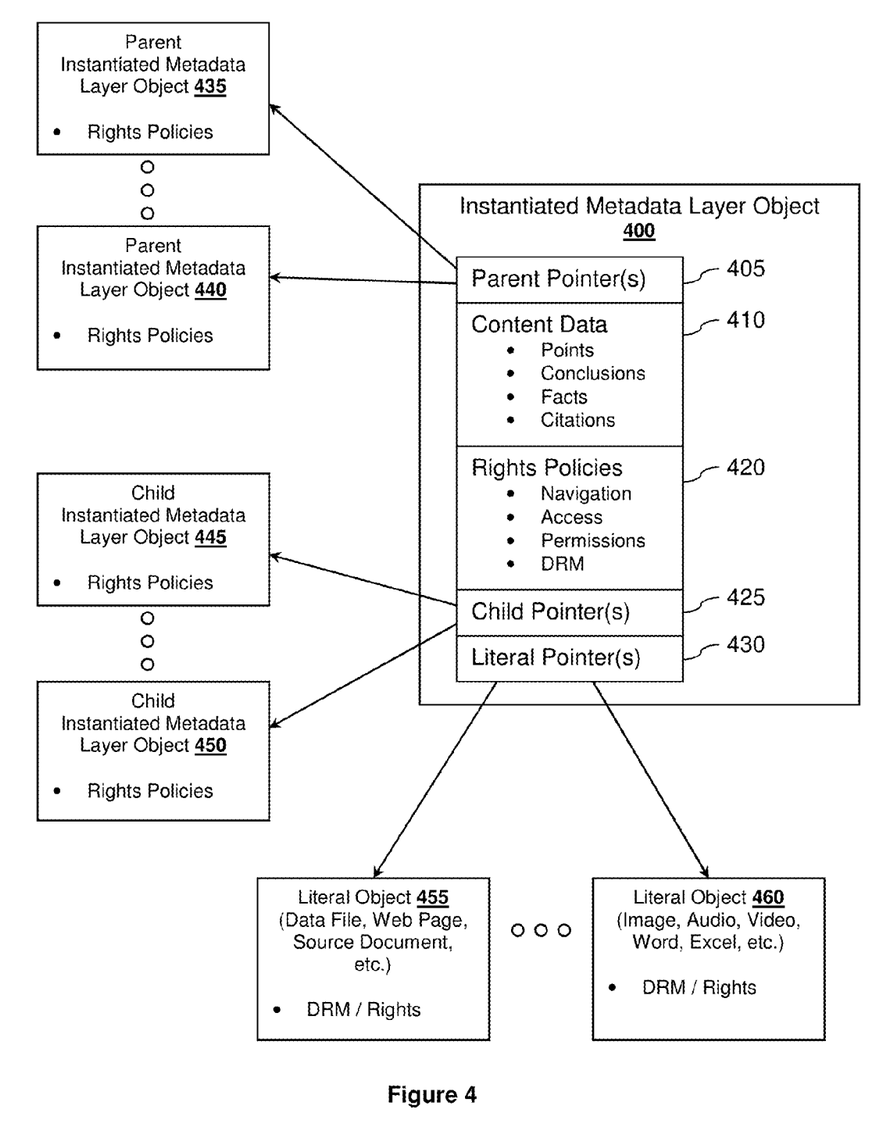
FIG. 4 illustrates an example instantiated metadata layer object.

FIG. 4 illustrates an example metadata layer object 400 that is instantiated by the metadata management engine 105. In the example, the metadata layer object 400 comprises parent pointers 405 that point to parent instantiated metadata layer objects (e.g., parent instantiated metadata layer objects 435 and 440), content data 410 (e.g., assertions such as points, conclusions, facts, as well as citations), rights policies 420 (e.g., navigation policies, access policies, permissions, DRM, etc.), child pointers 425 that point to child instantiated metadata layer objects (e.g., child instantiated metadata layer objects 445 and 450), and literal pointers 430 that point to the source literals (e.g., literal objects 455 and 460). Any one of the metadata layer objects 305-360 in FIG. 3 can have the same structure as the metadata layer object 400 of FIG. 4.

Once the instantiated metadata layer object is prepared, the metadata management engine 105 can store the instantiated metadata layer object with its rights policy into the metadata database 110. In some embodiments, the metadata database 110 can be local to the user, while in other embodiments as illustrated in FIG. 1, the metadata layer database 110 can be remote. For example, the metadata management system 100 could operate as a cloud-based enterprise-class for-fee service, possibly offering its services via one or more remote APIs. Thus, the metadata database 110 could be considered a component of a PaaS, IaaS, SaaS, or other type of distributed architecture. In yet other embodiments, metadata database 110 can be integrated within a productivity application (e.g., word processor, spreadsheet, browser, etc.) that is configured to operate as the management engine. Still further, the metadata database 110 could comprise a single file associated with a single source document where the single file stores all annotations or other metadata for the source document. Such a file can be stored as a Binary Large Object (BLOB).

The metadata management engine 105 is configured to provide and manage access of the metadata layer objects that are stored in the metadata database 110 to different users. When a user attempts to access a metadata layer object, the metadata management engine 105 is configured to determine the access rights of the user and then grant the user access to the metadata layer object based on the determined access rights. In some embodiments, the metadata management engine 105 first retrieves the rights policies that are stored in the metadata layer object to determine if the user is allowed to access the metadata layer object and whether any restrictions should be imposed to the user.

It is noted that other metadata layer object(s) linked by the metadata layer object (e.g., parent metadata layer objects, child metadata layer objects) can include rights policies that are in conflict with the rights policies of the metadata layer object. For example, the user has access to the metadata layer object according to the rights policies of the metadata layer object but might be prohibited from accessing the metadata layer object based on the rights policies of a parent metadata layer object of the metadata layer object. Therefore, the metadata management engine 105 is configured to detect securities and access conflicts among rights policies and resolve those conflicts before granting the user access to the metadata layer object.

Figure 5:
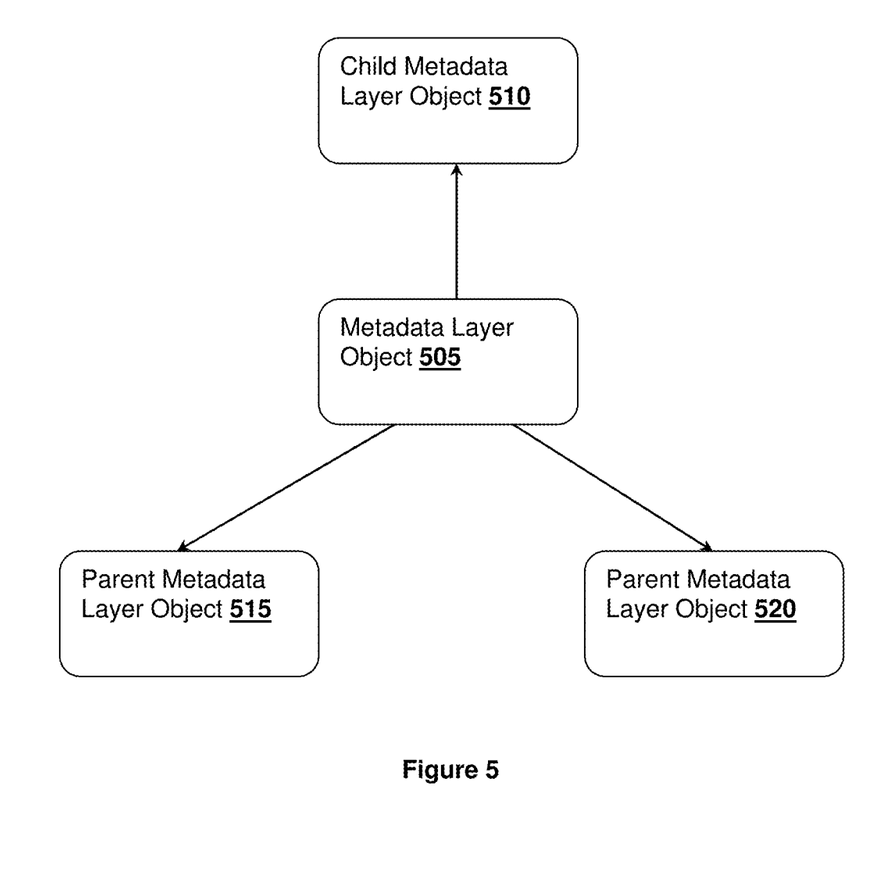
FIG. 5 conceptually illustrates another example metadata objects hierarchy.

Several examples of conflicts and possible ways of resolutions are illustrated below via FIG. 5. FIG. 5 illustrates a metadata hierarchical structure 500. The metadata hierarchical structure 500 includes four metadata layer objects 505-520. Metadata layer objects 515 and 520 link to different source content and do not have any parent metadata layer objects. Metadata layer object 505 includes an assertion that is derived from both of the assertions associated with metadata layer objects 515 and 520. Thus, metadata layer objects 515 and 520 are linked as parent metadata layer objects from the metadata layer object 505, and metadata layer object 505 is linked as a child metadata layer object from the metadata layer objects 515 and 520.

Metadata layer object 510 includes an assertion that is derived solely from the assertion associated with the metadata layer object 505. Thus, the metadata management engine 105 would have included a link in the metadata layer object 505 that points to the metadata layer object 510 as a child metadata layer object. Similarly, the metadata management engine 105 would have also included a link in the metadata layer object 510 that points to the metadata layer object 505 as a parent metadata layer object. All of the metadata layer objects 505-520 include rights policies that were determined by the creator of the objects or the metadata management engine 105.

In a first scenario based on the metadata layer object hierarchy as shown in FIG. 5, a user is trying to access metadata layer object 505 (and the assertion associated with the metadata layer object 505). As mentioned above, before granting access to the user, the metadata management engine 105 first determines whether the user has the proper security clearance and rights to access the metadata layer object 505. However, in the first scenario, the rights policies of metadata layer object 505 and the rights policies of metadata layer object 515 are in conflict with respect to giving the user access to metadata layer object 505. Specifically, while the rights policies of the metadata layer object 505 give the user permission to access the assertion included within the metadata layer object 505, the rights policies of the metadata layer object 515 prohibits the user from access the metadata layer object 515 and any assertion object that is downstream from the metadata layer object 515 (e.g., child metadata layer objects, grandchild metadata layer objects, etc.). As such, there is a conflict of rights policies with respect to the user's access to metadata layer object 505.

In some embodiments, the metadata management engine 105 can be configured to resolve the conflict in different ways. Under a first approach, the metadata management engine 105 can be configured to resolve the conflict based on priority rules that were predetermined (i.e., pre-programmed within the metadata management system 100). For example, the priority rules can specify that rights policies of the parent metadata layer objects have higher priorities than child metadata layer objects (i.e., the creator of the source can determine who can access the source information and any information derived from the source). If the metadata management engine 105 follows this rule in the above example, the engine 105 would deny the user access to the metadata layer object 505 because the rights policies of the metadata layer object 515 (parent metadata object to the object 505) prohibits the user from accessing the object 505.

On the other hand, the priority rules can instead specify that the child metadata layer objects have higher priorities than parent metadata layer objects (i.e., the creator of the assertion has full power to determine who can access the assertion). If the metadata management engine 105 follows this rule in the above example, the engine 105 would grant the user access to the metadata layer object 505 because the rights policies of the metadata layer object 505 allows the user to access the object 505. These priority rules can also be set or re-configured by an administrator of the metadata management system 100 at any time.

Under a second approach, the metadata management engine 105 can be configured to resolve a conflict by either (a) providing the most restrictive access rights to the user specified by the rights policies of the different metadata layer objects or (b) providing the least restrictive access rights to the user specified by the rights policies of the different metadata layer objects. As mentioned above, the rights policies included in a metadata layer object can include multiple different rights aspects. For example, they can include policies that concern the rights of linking to the metadata layer object (i.e., deriving another assertion from the assertion of the metadata layer object), policies that concern the rights of giving comments to the assertion of the metadata layer object, policies that concern the rights of editing the assertion of the metadata layer object, the rights of sharing the assertion of the metadata layer object in a social media, policies that concern the rights of accessing externally linked metadata layer objects, etc.

When the metadata management engine 105 is configured to resolve a conflict by providing the most restrictive access rights to the user, the metadata management engine 105 will compare the rights policies among the metadata layer objects and take the most restrictive policies from each rights aspect to generate the ultimate rights policies for the user. In a second scenario based on the metadata layer object hierarchy in FIG. 5, the rights policies of the metadata layer object 505 specify that the user is restricted from editing the assertion of the metadata layer object 505 and the rights policies of the metadata layer object 510 specify that the user is restricted from adding comments to the assertion of the metadata layer object 505. If the metadata management engine 105 takes the most restrictive approach as discussed above, the metadata management engine 105 would generate an ultimate rights policies for the user that include both the restriction from editing the assertion and the restriction from adding comments to the assertion to the metadata layer object 505.

Conversely, when the metadata management engine 105 is configured to resolve a conflict by providing the least restrictive access rights to the user, the metadata management engine 105 will compare the rights policies among the metadata layer objects and take the least restrictive policies from each rights aspect to generate the ultimate rights policies for the user. Using the second scenario, if the rights policies of metadata layer object 505 is silent about (or provide the user) the rights to add comments to the assertion of the metadata layer object 505, and the rights policies of metadata layer object 510 is silent about (or provide the user) the rights to edit the assertion of the metadata layer object 505, the metadata management engine 105 under this least restrictive approach would generate an ultimate rights policies will allow the user to both add comments to the assertion and edit the assertion of the metadata layer object 505.

The metadata management system 100 that manages security and access rights for different metadata layer objects within a metadata hierarchy structure as disclosed herein can be used in different areas. For example, the metadata management system 100 can be used as an intelligence knowledge database for the military. Field officers collect raw data (e.g., photos, maps, images, audio recording, etc.) and input their summarized report (i.e., points, facts, etc. of status, location, and other information of military targets) as an instantiated metadata layer object in the lowest layer in the hierarchy. As different military officers make use of the report and generate different intelligence assertions (e.g., conclusion, suggestions of plan of attack, etc.), the metadata management system 100 instantiates new metadata layer objects that point back to the metadata layer objects in the lowest layer. Other officers or can in turn make additional assertions based on one or more of these assertions and/or raw data to create new metadata layer objects in higher layers that point back to the lower layered metadata layer objects. The links that connect these metadata layer objects form a military intelligence knowledge hierarchy. Different military personnel (and/or politicians) can access different layers of metadata layer objects based on their title, their clearance levels, etc. For example, a senator might be able to view a high level analysis of the situation in a military zone that is generated by the head of the military group, but might not be able to view the sources from which the analysis is based (including the raw data). On the other hand, the head of a different intelligence unit might be able to view everything but might not be able to add comment or additional assertion (metadata layer objects) to the structure so that the integrity of the metadata layer objects hierarchy is maintained by the military group that owns the metadata layer objects.

In another example, the metadata management system 100 can be used in a medical field. Nurses who take simple data from patients (e.g., temperature, blood pressure) or lab associates who perform testing (e.g., MRI, X-rays, etc.) will create instantiated metadata layer objects that will be on the bottom layer of the hierarchy. As other nurses or doctors make assertions (e.g., diagnosis, etc.) based on these raw findings, new instantiated metadata layer objects are created that point back to the metadata layer objects of lower layers, and so forth. When the patients are transferred to different hospitals, the doctors/nurses at the other hospitals can access some or all of these metadata layer objects based on their titles/roles (and might even based on the condition of the patients, the more critical the condition is, the more access the doctors/nurses will have for example) to care for the patients.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The invention claimed is:

1. A computer-implemented method of managing metadata, comprising:
   providing a database configured to store linkable instantiated metadata layer objects, each instantiated metadata layer object comprising object links, metadata content, and a rights policy;
   instantiating, by a metadata management engine, a metadata layer object as an instantiated metadata layer object upon recognition of an annotation event by linking the instantiated metadata layer object to a set of external metadata objects, and populating metadata content of the instantiated metadata layer object based on annotation content from the annotation event;
   generating, by the metadata management engine, a metadata rights policy for the instantiated metadata layer object based on the annotation event;
   storing the instantiated metadata layer object with its metadata rights policy in the metadata layer database;
   determining, by the metadata management engine, an authorization of a user with respect to accessing the instantiated metadata layer object by resolving a difference between the metadata rights policy of the instantiated metadata layer object and the metadata rights policy of at least one of the external metadata objects; and
   restricting, by the metadata management engine, the user from accessing the at least one of the external metadata objects according to the determined authorization.

2. The method of claim 1, further comprising restricting the user from access the instantiated metadata layer object.

3. The method of claim 1, wherein generating the metadata rights policy comprising retrieving copyright information associated with the metadata layer object from an external database and generating the metadata rights policy to comply with the retrieved copyright information.

4. The method of claim 1, further comprising enabling a creator who initiated the annotation event to provide access rights information.

5. The method of claim 4, wherein generating the metadata rights policy for the instantiated metadata layer object comprises generating the metadata rights policy based on the provided access rights information.

6. The method of claim 1, wherein the recognition of the annotation event comprises a receiving a selection of at least a portion of a source document.

7. The method of claim 6, wherein the metadata rights policy for the instantiated metadata layer object depends on access rights data of the source document.

8. The method of claim 1, wherein the generated metadata rights policy provide access rights to the instantiated metadata layer object based on a role of a user who requests access to the instantiated metadata layer object.

9. The method of claim 8, wherein determining the authorization comprising determining a role of the user within an organization.

10. The method of claim 9, further comprising restricting the user from accessing the instantiated metadata layer object based on the role of the user.

11. The method of claim 9, wherein restricting the user from accessing the external metadata object comprises restricting the user from accessing the external metadata object based on the role of the user.

12. The method of claim 1, wherein determining the authorization comprises determining a security clearance of the user within an organization.

13. The method of claim 12, further comprising restricting the user from accessing the instantiated metadata layer object based on the security clearance of the user.

14. The method of claim 12, further comprising restricting the user from accessing the external metadata object based on the security clearance of the user.

* * * * *